United States Patent [19]

Voyce

[11] Patent Number: 5,210,539
[45] Date of Patent: May 11, 1993

[54] LINEAR FREQUENCY SWEEP SYNTHESIZER

[75] Inventor: Kenneth G. Voyce, Bellevue, Wash.

[73] Assignee: The Boeing Company, Seattle, Wash.

[21] Appl. No.: 913,777

[22] Filed: Sep. 30, 1986

[51] Int. Cl.⁵ ............................................. G01S 13/32
[52] U.S. Cl. ....................................... 342/83; 342/200; 331/4; 331/178
[58] Field of Search .......................... 342/83, 128, 200; 331/4, 178, 7, 179

[56] References Cited

U.S. PATENT DOCUMENTS

| | | | |
|---|---|---|---|
| 3,283,254 | 11/1966 | Haynie | 328/71 |
| 3,364,437 | 1/1968 | Loposer et al. | 331/1 |
| 3,375,461 | 3/1968 | Ribour et al. | 331/4 |
| 3,382,460 | 5/1968 | Blitz et al. | 331/178 |
| 3,383,619 | 5/1968 | Naubereit et al. | 331/4 |
| 3,391,348 | 7/1968 | Kohler | 331/4 |
| 3,401,353 | 9/1968 | Hughes | 331/178 X |
| 3,535,651 | 10/1970 | Peterson | 331/4 |
| 3,579,281 | 5/1971 | Kam | 332/30 V |
| 3,597,699 | 8/1971 | Selpel | 331/18 |
| 3,611,175 | 10/1971 | Boelke | 331/4 |
| 3,638,135 | 1/1972 | Stover | 331/14 |
| 3,777,276 | 12/1973 | Klein | 331/4 |
| 3,946,329 | 3/1976 | Caspari | 331/4 |
| 3,962,653 | 7/1976 | Basset | 331/4 X |
| 3,965,438 | 7/1976 | Winston, IV | 331/4 X |
| 4,083,015 | 4/1978 | Popodi | 331/4 |
| 4,156,205 | 5/1979 | Kadin et al. | 331/25 |
| 4,272,729 | 6/1981 | Riley, Jr. | 331/4 X |
| 4,342,007 | 7/1982 | Elliott | 334/4 |
| 4,349,789 | 9/1982 | Kurihara | 331/4 |
| 4,388,597 | 6/1983 | Bickley et al. | 331/2 |
| 4,490,688 | 12/1984 | Borras et al. | 331/1 A |

FOREIGN PATENT DOCUMENTS 2932049 2/1981 Fed. Rep. of Germany .......... 331/4

OTHER PUBLICATIONS

Peyton Z. Peebles, Jr., "Design of a Highly Linear Closed Loop FMCW Sweep Generator," Technical Report T-79-78, U.S. Army Missle Command, Restone Arsenal, Alabama, Aug. 8, 1979.

Primary Examiner—Tod R. Swann
Attorney, Agent, or Firm—Christensen, O'Connor, Johnson & Kindness

[57] ABSTRACT

A circuit for generating an output signal having an output frequency that varies linearly with time, and to an FM CW radar system utilizing such a circuit. The circuit includes a voltage controlled oscillator that produces an output signal at its output terminal at an output frequency that corresponds to the voltage of an input tuning signal. A comparison signal circuit receives the output signal and produces a periodic comparison signal such that when the output frequency varies by $\Delta f$, the comparison signal frequency varies by $\Delta f/N$ where N is a positive integer. An update counter periodically causes the value of N to change by a predetermined integer amount. A phase detector compares the comparison signal to a periodic reference signal, and produces a correction signal that is filtered to provide the tuning signal for the VCO. The value of N is preferably changed at an update frequency that is equal to the frequency of the reference signal times an integer. The comparison signal circuit preferably includes a local oscillator for converting the output signal into a periodic IF signal for input to a divider. A high side local oscillator is preferred to minimize loop gain variation with frequency.

18 Claims, 3 Drawing Sheets

LINEAR FREQUENCY SWEEP SYNTHESIZER

FIELD OF THE INVENTION

The present invention relates to circuits that produce output signals having frequencies that vary linearly with time, and to FW CW radars employing linear frequency sweeps.

BACKGROUND OF THE INVENTION

In one type of radar system, the transmitter is driven by a CW signal having a frequency that varies linearly with time. The signal is derived from a voltage controlled oscillator (VCO), and the input signal to the VCO is controlled to produce the linear frequency sweep. The return signal from a target is mixed with the transmitted signal to produce a difference signal having a frequency equal to the difference between the instantaneous frequency of the transmitted signal and the return signal. Because the frequency of the transmitted signal changes linearly with time, the frequency of the difference signal is a function of target range.

In the system of the type described above, there are four criteria that must be met to develop an effective radar. The first criteria is that the frequency sweep must be highly linear, in order for the radar to have adequate range resolution. This is a difficult problem, because even the best RF sources have nonlinear tuning characteristics, i.e., the frequency of the VCO output signal is not a linear function of the input voltage. The second criteria is that the frequency sweep must be repeatable, i.e., must have constant starting frequency and slope, so that the radar will have Doppler capability. This requirement restricts the choice of the clock and reference frequencies. The third criteria is that the sweep synthesizer must be one that minimizes cost and size. The fourth criteria in designing an effective FW CW radar is that the linearization of the sweep must be able to adapt immediately to changes in the tuning characteristics of the VCO, which tuning characteristics depend on the terminating impedance at the RF output. This terminating impedance does not remain constant because the antenna must scan, and because polarization switching may occur.

Past efforts to produce a fast, linear frequency sweep have involved both open loop and closed loop designs. To date, open loop techniques have proved nearly impossible to align. If and when they are aligned, they are still sensitive to changes in temperature. Closed loop designs have included phase lock loops in which a signal representing the rate of change of the frequency of the transmitted signal is phase locked to a crystal source. One successful implementation of such a closed loop design is described in U.S. patent application Ser. No. 902,658, filed Sep. 2, 1986, entitled Apparatus and Method for Producing Linear Frequency Sweep. However, the approach described in that application has the disadvantage that it requires three RF sources, three RF mixers, and a delay line.

SUMMARY OF THE INVENTION

The present invention provides an apparatus and method for generating an output signal having an output frequency that varies linearly with time, and an FM CW radar system that utilizes such a circuit. The circuit of the present invention produces a significant improvement in the linearity of the sweep of the output frequency, such that high accuracies can be obtained, even in a high sweep rate, scanning radar system.

The apparatus of the present invention comprises a voltage controlled oscillator, a comparison signal generator, phase detection means and filter means. The voltage controlled oscillator has input and output terminals, and includes means for producing an output signal at its output terminal at an output frequency, such that the output frequency corresponds to the voltage of a tuning signal applied to its input terminal. The comparison signal generator includes division means and update means. The division means is responsive to the output signal for producing a periodic comparison signal at a comparison frequency, such that when the output frequency varies by $\Delta f$, the comparison frequency varies by $\Delta f/N$ where N is a positive integer. The update means periodically causes the value of N to change by a predetermined integer amount. The phase detection means compares the comparison signal to a periodic reference signal, and produces a correction signal corresponding to the difference between the phases of the comparison and reference signals. The filter means filters the correction signal to produce the tuning signal for input to the input terminal of the voltage controlled oscillator. The result is an output frequency that varies linearly with time.

In a preferred embodiment, the value of N is changed by the update means at an update frequency that is equal to the reference frequency times P, where P is a positive integer. The comparison signal generator also preferably includes a local oscillator for converting the output signal into a periodic IF signal for input to the division means. The local oscillator is preferably a high side local oscillator, to minimize variations in loop gain over the course of a frequency sweep.

DETAILED DESCRIPTION OF THE INVENTION

Figure 1:
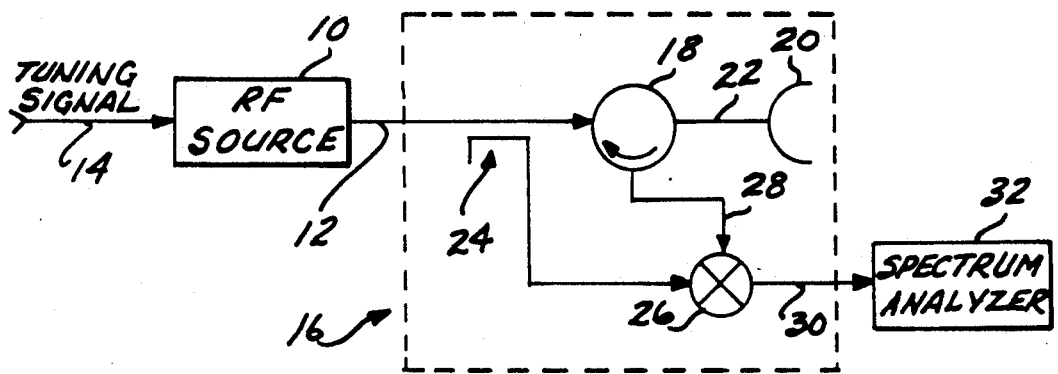
FIG. 1 is a simplified diagram of a prior art FM CW radar system.
Figure 2:
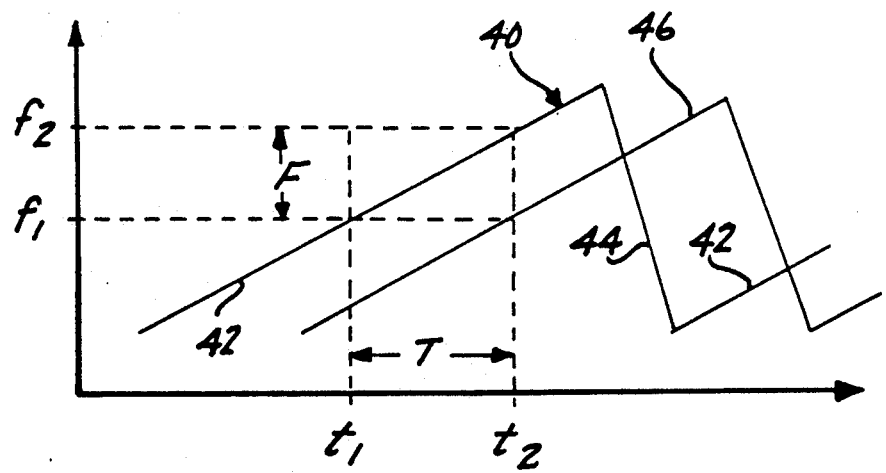
FIG. 2 is a signal diagram for the radar system of FIG. 1.

FIGS. 1 and 2 illustrate the general principles of operation of an FM CW radar system. The system comprises an RF source 10 having an output terminal connected to line 12 and an input terminal connected to line 14. RF source 10 produces an output signal on line 12 having a frequency determined by the voltage of a tuning signal on line 14. The output signal is fed to antenna system 16 that comprises circulator 18, antenna 20, directional coupler 24 and mixer 26. The output signal from the RF source on line 12 is input to circulator 18 and directed by the circulator to antenna 20 via line 22. A sample of the output signal on line 12 is picked off by directional coupler 24 and input to one terminal of mixer 26. A return signal from a target passes through antenna 20, line 22, circulator 18, and the circulator passes the return signal to a second terminal of mixer 26 via line 28. Mixer 26 produces an IF signal on line 30 having a frequency equal to the difference between the instantaneous frequencies of the output signal on line 12 and the return signal. The difference frequency is input to a frequency measuring device such as spectrum analyzer 32.

In the operation of the system shown in FIG. 1, the tuning signal on line 14 is caused to sweep over a prescribed voltage range, such that the frequency of the output signal on line 12 sweeps through a prescribed frequency range. The frequency of the output signal is schematically illustrated by graph 40 in FIG. 2. Graph 40 comprises sweep portions 42 and retrace portions 44. Assuming that there is a target at a fixed range from antenna 20, the return from such a target is illustrated by graph 46 in FIG. 2. If the time required for a radar signal to make a round trip from the antenna to the target and back to the antenna is designated by T, then the radar signal transmitted at time $t_1$ at frequency $f_1$ will return to the radar system at time $t_2$, where $t_2$ is equal to $t_1 + T$. At time $t_2$, the return signal at frequency $f_1$ will be mixed with the instantaneous value of the transmitted signal at frequency $f_2$, and mixer 26 will produce a difference signal at frequency F. If ramp portion 42 is linear, then difference frequency F will be an accurate measure of time T, and therefore of the range to the target.

Figure 3:
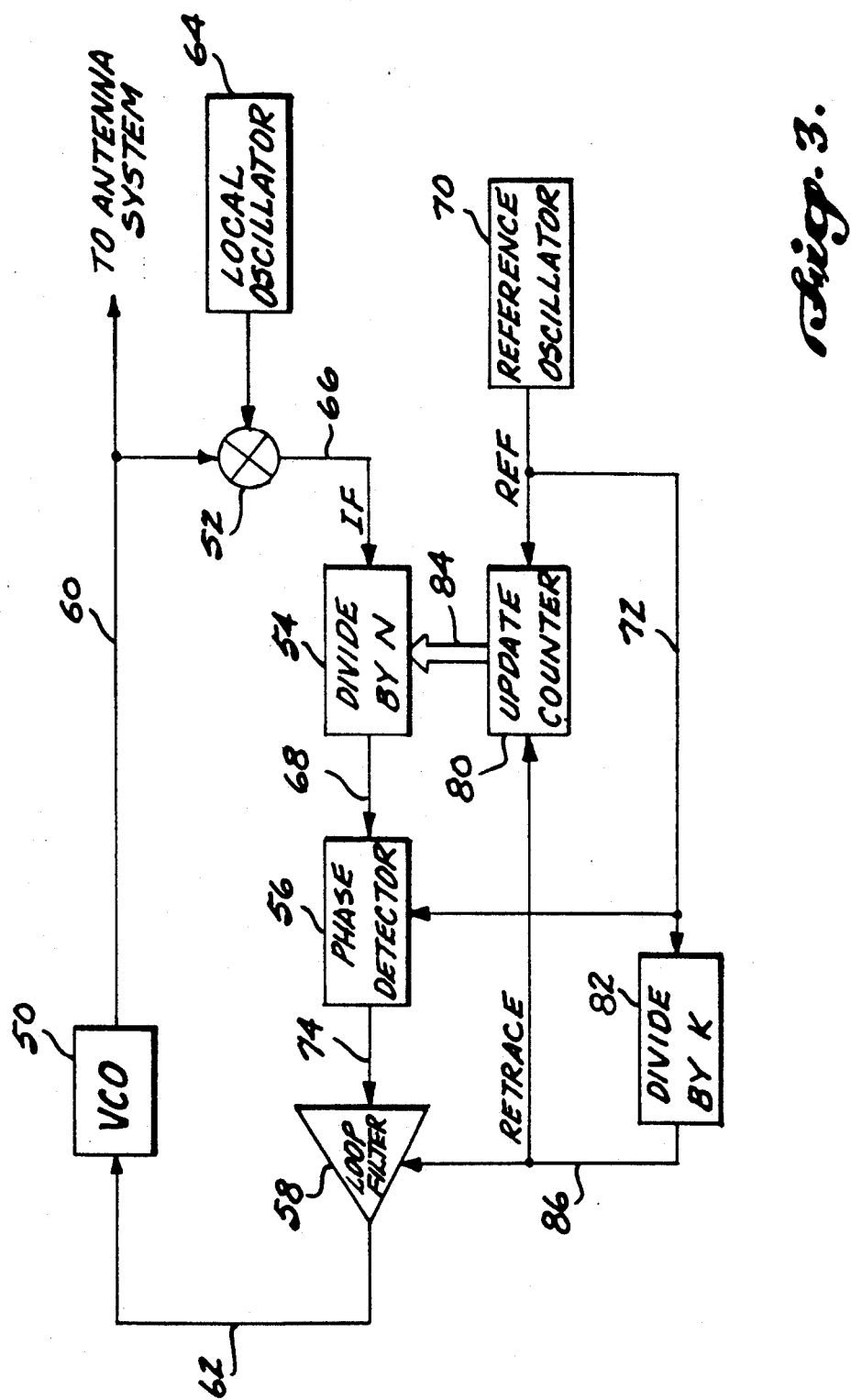
FIG. 3 is a block diagram of a preferred embodiment of the frequency sweep synthesizer of the present invention.

A preferred embodiment of the frequency sweep synthesizer of the present invention is set forth in FIG. 3. The synthesizer may be used as RF source 10 in the radar system shown in FIG. 1. The synthesizer includes a phase lock loop comprising voltage controlled oscillator (VCO) 50, mixer 52, divide by N circuit 54, phase detector 56, and loop filter 58. VCO 50 has an output terminal connected to line 60 and an input terminal connected to line 62. In the absence of an input signal at its input terminal, the VCO produces an output signal on line 60 at a predetermined center frequency. The output signal is sent, for example, to the antenna system of a radar system, and is also input to mixer 52. The mixer mixes the output signal with a fixed frequency mixing signal provided by local oscillator 64, to produce an IF signal on line 66 that is input to divide by N counter 54. The divide by N counter produces a comparison signal on line 68 that has a frequency that is a factor of N lower than the frequency of the IF signal. Divide by N circuit 54 also changes the sinusoidal IF signal to a square wave comparison signal.

The comparison signal on line 68 forms one input to phase detector 56, the other input to the phase detector being an REF signal produced by reference oscillator 70 on line 72. The phase detector produces an error signal on line 74 that has a magnitude that is a function of the phase difference between the comparison and reference signals. The error signal is input to loop filter 58, and the loop filters the error signal to produce a tuning signal on line 62. As a result of this loop, the frequency of the output signal on line 60 will be controlled such that the phase of the comparison signal on line 68 matches the phase of the reference signal on line 72. Thus as long as the value of N remains constant, a constant frequency output signal will be produced on line 60.

Additional components of the frequency sweep synthesizer shown in FIG. 3 are update counter 80 and divide by K circuit 82. Update counter 80 counts cycles of the REF signal on line 72, and provides its accumulated count, as the value N, to divide by N circuit 54 via bus 84. Divide by K circuit 82 divides the frequency of the REF signal by K, and provides an output retrace signal on line 86 every K cycles of the REF signal. The retrace signal is used to reinitialize loop filter 58 and update counter 80 at the end of each frequency sweep. This reinitialization corresponds to retrace portion 44 of the graph shown in FIG. 2. Derivation of the retrace signal from the REF signal guarantees that the retrace and REF signals will be coherent, so that each sweep will be identical to all other sweeps, thereby permitting an associated radar system to have Doppler capability.

Figure 4:
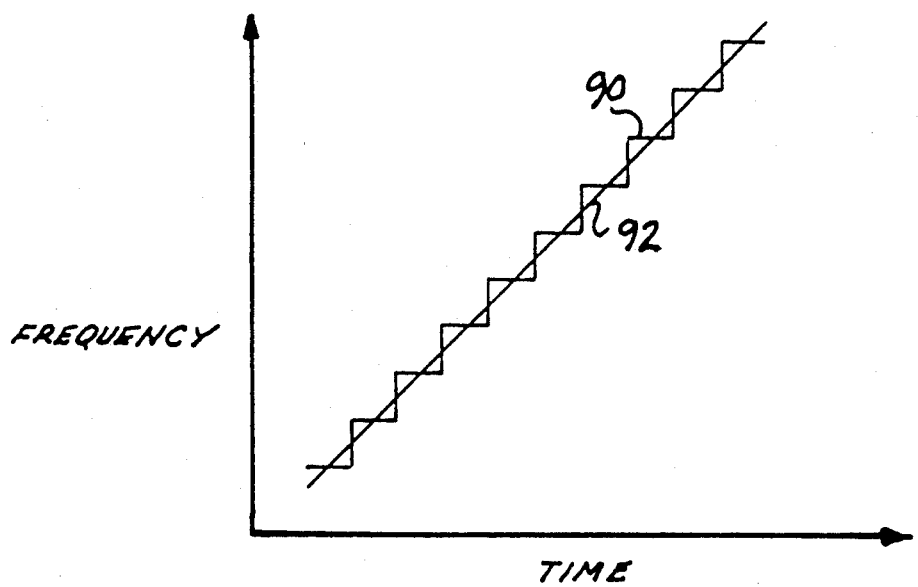
FIG. 4 is a graph showing variation of frequency with time.

The operation of the circuit shown in FIG. 3 can be understood by noting that the phase lock loop will cause the frequency of the comparison signal on line 68 to be equal to $f_{REF}$, the frequency of the REF signal. The loop will therefore cause the frequency of the IF signal on line 66 to be equal to $N \cdot F_{REF}$. Thus as the value of N is changed, the frequency of the IF signal on line 66, and therefore of the output signal on line 60, undergo corresponding changes. Assume for the sake of example that the circuit uses a low side local oscillator, i.e., that the frequency of local oscillator 64 is lower than the frequency of the output signal on line 60. In such a case, an increase in the frequency of the output signal on line 60 will produce a corresponding increase of the frequency of the IF signal on line 66. If a high side local oscillator were to be used, i.e., a local oscillator having a frequency greater than the frequency of the output signal, then the opposite would be true, i.e., an increase in the frequency of the output signal would produce a decrease in the frequency of the IF signal. However, assuming a low side local oscillator for the present example, it can be seen that if the value of N were increased in steps of size P at a comparatively slow rate, the result would be that the frequency of the output signal on line 60 would also increase in steps, as indicated by graph 90 of FIG. 4.

Referring again to FIG. 3, it will be noted that the value of N is supplied by update counter 80, and that the rate at which N changes is equal to $P \cdot f_{REF}$, the frequency of the REF signal on line 72 multiplied by the number by which N is incremented or decremented each cycle of REF. The frequency of $P \cdot f_{REF}$ is chosen to be outside the bandwidth of the phase lock loop. As a result, the loop is unable to follow the staircase illustrated by graph 90, and instead responds by sweeping the frequency of the output signal in a linear manner, as indicated by line 92 in FIG. 4. The result is a highly linear frequency sweep. For the present invention, it is not required that the same signal be used as the reference signal for phase detector 56 and as the input signal for update counter 80. However use of the REF signal for both of these functions simplifies the circuitry, and also provides a repeatable sweep, as described in greater detail below.

The operation of the frequency sweep synthesizer circuit shown in FIG. 3 may be further understood by means of an example. Assume that the desired frequency sweep of the output signal on line 60 is from 45 to 46 GHz, and that a high side local oscillator is selected having a frequency of 46.3 GHz. The frequency of the IF signal on line 66 thereby varies from 1300 to 300 MHz during one sweep. Further assume that the value of $f_{REF}$ is 1.43 MHz, and that the value of P is 2. This sweep could be achieved by causing N to vary from a starting value of 910 to a final value of 208, in 351 steps of 2 each. For this example, update counter 80 would be adapted to initialize itself to a value of 910 in response to the retrace signal on line 86, and each cycle of the REF signal on line 72 would then cause the value of N to decrement by 2. The value of K in this example would be 351. Thus after the expiration of 351 cycles of the REF signal, divide by K circuit 82 would provide another retrace signal, to commence a new frequency sweep. The coherence between the signal input to update counter 80, the signal input to phase detector 56, and the signal provided by divide by K circuit 82 is an important aspect of the present invention, and is the condition necessary to produce a repeatable sweep. In addition, providing an integer relationship between $f_{REF}$ and the update frequency eliminates the possibility of switching transients occurring as each update is made, because it insures that such updates are made at zero crossings of the VCO.

The preferred value for P is a compromise between two competing considerations. The bandwidth of the phase lock loop should be restricted in order to achieve stability and to smooth out the staircase into a linear frequency sweep. However the loop's error correcting capability improves as the bandwidth is made wider. To reach the best compromise, the number of steps must first be chosen to allow the widest bandwidth while still yielding adequate rejection of the staircase. In general, values of 1 or 2 for P will yield the best results.

Figure 5:
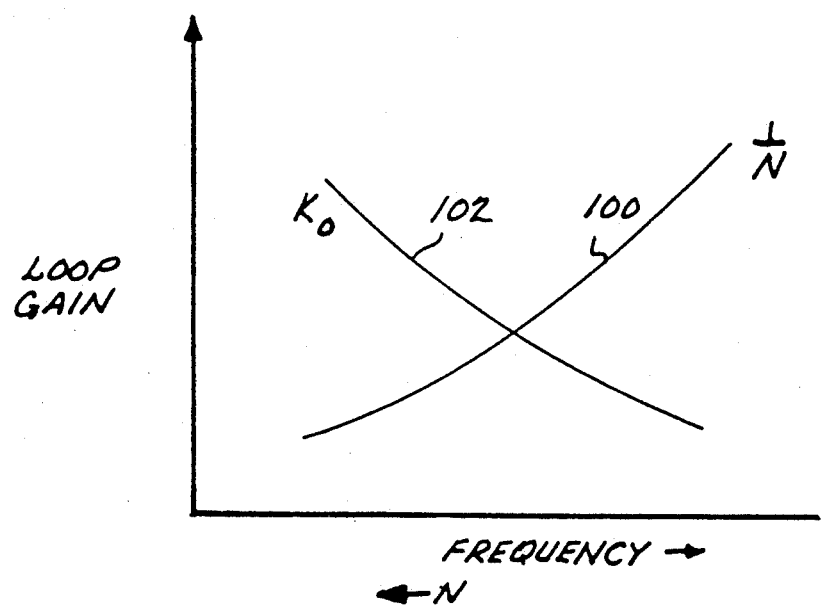
FIG. 5 is a graph showing the variation of loop gain with frequency.

In a preferred embodiment of the invention, local oscillator 64 is a high side local oscillator. The reason for this preference is based on stability considerations. VCO 50 has a gain factor $K_o$ (Hertz/volt) that changes as the frequency and input voltage change, i.e., gain factor $K_o$ changes throughout a sweep. The higher the overall loop gain is, the higher error correcting factor is obtained, but the less stable the loop is. It is therefore desirable to have a constant loop gain throughout each sweep. The presence of divide by N counter 54 in the loop results in a gain factor in the loop that is proportional to 1/N. FIG. 5 schematically illustrates the variations of gain factors of VCO 50 and divide by N counter 54 with frequency for the case of a high side local oscillator. In such an arrangement, an increase in frequency corresponds to a decrease in the value of N. Thus in FIG. 5, curve 100 represents the variation in loop gain (1/N) caused by divide by N counter 54, and curve 102 represents the variation in loop gain with frequency due to the variation of VCO gain factor $K_0$. As may be seen, for a high side local oscillator, the two nonlinearities shown in FIG. 5 tend to cancel. By contrast, for a low side local oscillator, curve 100 would be reversed from left to right, i.e., frequency and N would both increase to the right. In this case, the nonlinearities would tend to add. The high side local oscillator is therefore preferred.

While the preferred embodiments of the invention have been illustrated and described, variations will be apparent to those skilled in the art. Accordingly, the invention is not to be limited to the specific embodiments illustrated and described, and the true scope of the invention is to be determined by reference to the following claims.

The embodiments of the invention in which an exclusive property or privilege is claimed are defined as follows:

1. A circuit for generating a periodic output signal having an output frequency that varies linearly with time, the circuit comprising:
    a voltage controlled oscillator having input and output terminals, and means for producing the output signal at its output terminal at the output frequency such that the output frequency corresponds to the voltage of a tuning signal applied to the input terminal;
    a comparison signal generator including division means responsive to the output signal for producing a periodic comparison signal having a comparison frequency such that when the output frequency varies by $\Delta f$, the comparison frequency varies by $\Delta f/N$ where N is a positive integer, and update means for periodically causing the value of N to change by a predetermined integer amount as a function of a fixed periodic reference frequency signal;
    phase detection means for comparing the comparison signal to the fixed periodic reference frequency signal, and for producing a correction signal corresponding to the difference between the phases of the comparison and reference signals; and
    filter means for filtering the correction signal to produce the tuning signal.

2. The circuit of claim 1, wherein the value of N is changed by the update means at an update frequency that is equal to the reference frequency times P, where P is a positive integer.

3. The circuit of claim 2, wherein P is equal to 1 or 2.

4. The circuit of claim 1, wherein the comparison signal generator comprises a local oscillator for producing a periodic mixing signal at a mixing frequency, mixing means for combining the mixing signal with the output signal to produce a periodic IF signal at an IF frequency equal to the difference between the output and mixing frequencies, and divide by N means connected to receive the IF signal and to divide the frequency of the IF signal by N to produce the comparison signal.

5. The circuit of claim 3, wherein the mixing frequency is higher than the frequency of the output signal.

6. The circuit of claim 1, further comprising retrace means for producing a periodic retrace signal, and wherein the update means is connected to receive the retrace signal and includes initialization means responsive to the retrace signal for causing the value of N to change to a predetermined initial value.

7. The circuit of claim 6, wherein the frequency of the retrace signal is equal to the reference frequency divided by K, where K is a positive integer.

8. The circuit of claim 7, wherein the value of N is changed by the update means at an update frequency that is equal to the reference frequency times P, where P is a positive integer.

9. The circuit of claim 8, wherein P is equal to 1 or 2.

10. In an FM CW radar system comprising an RF source for producing a periodic output signal having an output frequency that varies linearly with time, an antenna, a mixer having first and second input terminals, means for coupling the output signal to the antenna and to the first input terminal of the mixer, and means for coupling a return signal received at the antenna to the second input terminal of the mixer, whereby the mixer produces a range signal having a frequency corresponding to target range, an improved RF source comprising:
    a voltage controlled oscillator having input and output terminals, and means for producing the output signal at its output terminal at the output frequency such that the output frequency corresponds to the voltage of a tuning signal applied to the input terminal;

a comparison signal generator including division means responsive to the output signal for producing a periodic comparison signal having a comparison frequency such that when the output frequency varies by $\Delta f$, the comparison frequency varies by $\Delta f/N$ where N is a positive integer, and update means for periodically causing the value of N to change by a predetermined integer amount in response to a fixed periodic reference frequency signal;

phase detection means for comparing the comparison signal to the fixed periodic reference frequency signal, and for producing a correction signal corresponding to the difference between the phases of the comparison and reference signals; and filter means for filtering the correction signal to produce the tuning signal.

11. The radar system of claim 10, wherein the value of N is changed by the update means at an update frequency that is equal to the reference frequency times P, where P is a positive integer.

12. The radar system of claim 11, wherein P is equal to 1 or 2.

13. The radar system of claim 10, wherein the comparison signal generator comprises a local oscillator for producing a periodic mixing signal at a mixing frequency, mixing means for combining the mixing signal with the output signal to produce a periodic IF signal at an IF frequency equal to the difference between the output and mixing frequencies, and divide by N means connected to receive the IF signal and to divide the frequency of the IF signal by N to produce the comparison signal.

14. The radar system of claim 12, wherein the mixing frequency is higher than the frequency of the output signal.

15. The radar system of claim 10, further comprising retrace means for producing a periodic retrace signal, and wherein the update means is connected to receive the retrace signal and includes initialization means responsive to the retrace signal for causing the value of N to change to a predetermined initial value.

16. The radar system of claim 15, wherein the frequency of the retrace signal is equal to the reference frequency divided by K, where K is a positive integer.

17. The radar system of claim 16, wherein the value of N is changed by the update means at an update frequency that is equal to the reference frequency times P, where P is a positive integer.

18. The radar system of claim 17, wherein P is equal to 1 or 2.

* * * * *